Rudolf Kingslake
Karl Tolle
INVENTORS

BY Daniel S. Mayne
Harold F. Bennett
ATTORNEY & AGENT

*Nearly Afocal*        *Stretch Magnification=2x*

| LENS | N | V | RADII | THICKNESSES |
|---|---|---|---|---|
| 1 | 1.611 | 58.8 | $R_1' = +25.96$ mm. | $t_1 = 5.76$ mm. |
|   |       |      | $R_2' = +61.75$     | $S_1 = 0.80$ |
| 2 | 1.605 | 43.6 | $R_3' = +61.75$     | $t_2 = 3.01$ |
|   |       |      | $R_4' = +21.64$     | $S_2 = 40.90$ |
| 3 | 1.517 | 64.5 | $R_5' = -30.78$     | $t_3 = 2.78$ |
| 4 | 1.649 | 33.8 | $R_6' = +36.07$     | $t_4 = 8.32$ |
|   |       |      | $R_7' = -53.51$     | $S_3 = 1.11$ |
| 5 | 1.517 | 64.5 | $R_8' = -53.51$     | $t_5 = 2.38$ |
|   |       |      | $R_9' = +36.07$     | $S_4 = 19.63$ |
| 6 | 1.517 | 64.5 | $R_{10} = -34.38$   | $t_6 = 2.14$ |
|   |       |      | $R_{11} = -98.06$   | $S_5 = 0.40$ |
| 7 | 1.517 | 64.5 | $R_{12} = \infty$   | $t_7 = 3.26$ |
|   |       |      | $R_{13}'' = -37.43$ | $L' = 9.51$ |

*Fig. 3*

Rudolf Kingslake
Karl Tolle
INVENTORS

United States Patent Office 2,933,017
Patented Apr. 19, 1960

2,933,017

ANAMORPHOSING LENS SYSTEMS FOR USE IN CONVERGENT LIGHT

Rudolf Kingslake and Karl Tolle, Rochester, N.Y., assignors to Eastman Kodak Company, Rochester, N.Y., a corporation of New Jersey Application September 14, 1956, Serial No. 610,007

2 Claims. (Cl. 88—57)

This invention relates to anamorphotic lens systems, and its object is to provide a compact and well corrected anamorphotic lens system operable in a convergent beam of light for photographic and projection purposes.

By "anamorphotic lens system" is meant an optical system including lens elements of cylindrical power and producing different degrees of magnification in different directions in the plane of the image. As a typical example the magnification in the horizontal direction may be twice that in the vertical direction. Ordinarily such systems are combined with standard optical systems of spherical power to produce an image of the required over-all size.

Heretofore, it has been customary to place the anamorphotic lens system in collimated light between two parts of the standard system or at least to place it where the light is only slightly convergent, that is on the long-conjugate side. This is done to simplify the design problem, since an afocal anamorphotic system in collimated light is not subject to astigmatism in the neutral plane. Also, it has been generally assumed that the various aberrations are better corrected using that arrangement and so it is generally used even though it involves the use of two standard objectives when working at finite conjugates.

We have discovered, however, that a very high degree of correction can be obtained with the anamorphotic system in convergent (or divergent) light and that certain practical advantages accrue therefrom. Principally, when working at finite conjugates and low magnification, the over-all system is considerably simplified by the use of only one standard objective rather than two as were previously necessary when the anamorphotic system was placed in collimated light. Also, in the case of systems of high magnification, the lens diameters required are, with few exceptions, smaller in a convergent beam than in a collimated beam covering the same angular field, resulting in an economy, and in addition the system as a whole is made more compact and hence easier to mount by having the anamorphotic system in the space between the standard system and its image plane rather than in front of it.

It will be noted that the degree of convergence or divergence of the light rays on the opposite side of the standard system is of no consequence, that is to say, the whole system may work at low magnification or at infinity without affecting the operation of the anamorphotic system itself. The anamorphotic system is designed for receiving convergent light from a well-corrected standard optical system and for forming a well-corrected anamorphosed image in a plane close to but not necessarily coinciding with the original focal plane. The specified conditions in a typical case are: (1) the free distance between the standard optical system and its image plane, taking the mount into account, (2) the relative aperture, the pupil position and the angular field covered by the standard optical system, (3) unit magnification in the neutral plane and (4) the required anamorphotic or stretch magnification in the active plane of the anamorphotic system.

By stretch magnification is meant the ratio of the magnification in the active plane to that in the neutral plane. By the active plane is meant the axial plane in which the magnification of the anamorphotic system differs the most from unity, and by neutral plane is meant the axial plane perpendicular thereto.

According to the invention, an anamorphotic lens system adapted to receive a convergent bundle of light rays from a standard optical system and to form an anamorphosed image in a plane near the image plane of the standard optical system is made up comprising two members of cylindrical power, one positive and one negative, and a third member, all axially aligned with the standard system and with one another, the positive member being next to the standard optical system, meniscus in outward form and convex to said optical system, and the negative member being between the positive member and the third member and biconcave in outward form, the active planes of these two members being in coincidence, and the third member being between the second member and the plane of the anamorphosed image and including a lens element with negative power in the neutral plane for flattening the secondary curvature of field in the active plane. Preferably the third member is meniscus in outward form and concave toward the other two members in respect to its average surface curvatures as measured on a 45° diagonal plane between said active and said neutral plane. Conveniently, the distance from the third member to the plane of the anamorphosed image is between 0.01 L and 0.2 L where L is the total length of the anamorphotic system measured from the anamorphotic image plane to the vertex of the front surface of the positive member.

The total length L is considered as basic because, in designing an anamorphotic system of this type for use with a particular standard optical system, a designer would naturally make the system as long as practicable in view of the available space so as to use weak lens curvatures, but once an anamorphotic system is made up there is nothing to prevent its being used with another standard optical system having a longer image distance and a smaller angular field so long as the change in coma and other aberrations arising from the change in pupil position does not make the aberrations larger than tolerable under the conditions of use. In other words, the back focal length of the standard optical system is not basic because it is subject to change in use whereas the total length of the anamorphotic system defined above is determined by the shortest focal length system with which it is to be used and remains substantially fixed.

The design of such a system is beset with several difficulties not encountered in ordinary lens systems and including some not encountered in anamorphosers used in collimated light. The first of these is axial astigmatism, and to eliminate this condition two paraxial rays have to be computed after almost every change in lens parameters and one lens parameter adjusted to make the two paraxial foci coincide. The second difficulty lies in the four different field curvatures, namely the primary and secondary curvature in the active plane and the primary and secondary curvature in the neutral plane, which are discussed in more detail below.

Of these, we have discovered that the secondary curvature in the active plane is the most stubborn, although because of the zero surface powers in the main part of the anamorphotic system for this fan of rays, it has generally been considered to be negligible. It is largely to the correction of this aberration that the present invention is directed.

Rather less trouble was encountered in correcting the spherical aberration and coma in both the active and the neutral planes, while in regard to lateral and axial color, both were found to be substantially negligible in the neutral plane if corrected in the active plane. Fortunately, it was not required in this case to make the focal plane of the anamorphosed image coincide with the original focal plane as is characteristic of the so-called Bravais systems, although such systems are within the scope of the invention.

In the accompanying drawings:

Fig. 3 is a table of constructional data for a specific example.

Figure 1:
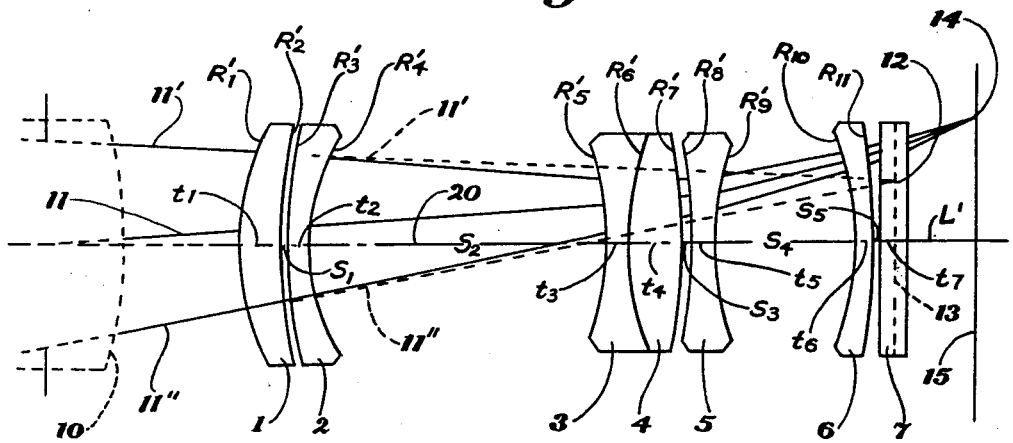
Fig. 1 is a diagrammatic axial section in the active plane of an anamorphotic system according to the invention.
Figure 2:
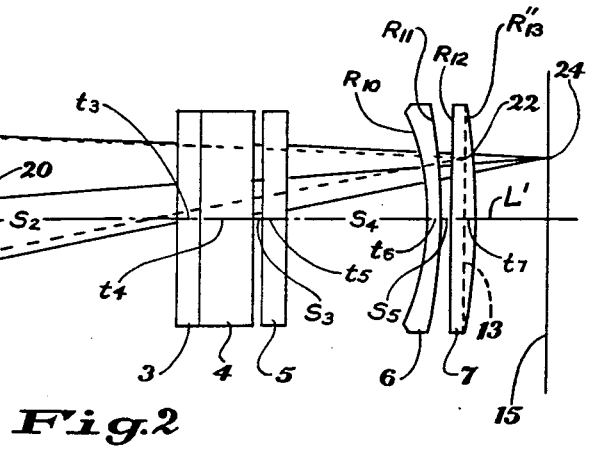
Fig. 2 is a diagrammatic axial section in the neutral plane of the same system.

In Figs. 1 and 2 an anamorphotic optical system is shown by way of example which comprises a front member of positive cylindrical power made up of lens elements 1 and 2, a middle member of negative cylindrical power made up of lens elements 3, 4 and 5, and a rear member of double curvature made up of lens element 6 having negative spherical power and lens element 7 having positive cylindrical power in the neutral plane.

In Fig. 1 a fan of rays represented by rays 11', 11 and 11" is shown emerging from the rear surface 10 of the standard optical system, indicated only in part, and converging toward an image point 12 on the image plane 13 of the standard optical system as shown by broken lines. They are intercepted by the anamorphotic system, however, and redirected to the image point 14 in the image plane 15 a short distance behind the original image plane 13. In this example the magnification in the active plane shown in Fig. 1 is 2.0, the effect on rays lying in this plane being the same as if lens elements 1 to 6 all had surfaces of spherical power and element 7 were a plane-parallel plate.

Fig. 2 shows the same system in the neutral plane, that is the plane in which the cylindrical axes of the surfaces R'₁ to R'₉ having the greatest anamorphosing effect lie.

In this plane, a fan of rays 21', 21, 21", corresponding to 11', 11, 11", is shown emerging from the rear surface 10 of the standard optical system and converging toward the image point 22 in the original image plane 13 as shown by broken lines. These rays, however, are intercepted by the anamorphotic system and redirected toward the image point 24 in the image plane 15. The major effect on rays in this plane is as if all the lens elements were plane parallel plates. Elements 6 and 7 act in this plane as if they both had surfaces of spherical power, but, because of the proximity to the focal plane, this is a minor effect. In the large, then, the rays in this plane are merely displaced by an amount such that the image point 24 is displaced in a direction substantially parallel to the axis by a distance which is the sum of all the individual image displacements. The individual displacement by each lens element acting as a plane parallel plate is $t(n-1)/n$; as given in Edser "Light for Students," page 55. This, of course, is only a rough value as regards elements 6 and 7, but it shows why the image plane tends inexorably to be displaced toward the rear, since in practice lenses cannot be made up with zero thickness.

We find it advantageous to compute the focal position in the neutral plane first and adjust some lens parameter such as the power of the front component or, for small changes, an airspace in the front component to make the focal position in the active plane coincide therewith.

The four distinct astigmatic curvatures of field, previously mentioned, are identified as follows: In Fig. 1 the tangential or primary image point is at the focal point of the fan of rays 11', 11, 11". Precisely speaking, it is the focal point of the rays indefinitely close to ray 11. The secondary or sagittal image point is at the focus of the rays in front of and behind the diagram which coincide with ray 11 when projected onto the plane of the diagram. These image points define the two curvatures in the active plane. In Fig. 2, similarly, the primary image point is at the focus of the fan of rays 21', 21, 21", and the secondary image point is at the focus of the fan of rays which coincide with ray 21 when projected onto the plane of the diagram. These two image points define the two curvatures in the neutral plane.

Restricting our consideration now to the main body of the anamorphotic system (elements 1 to 5) the cylindrical axes are all parallel and the primary curvature in the active plane is computed and controlled in the same way as primary curvature in an ordinary system of spherical power. The secondary fan of rays, however, is not subject to any surface powers in this part of the system and so has previously been thought to have negligible image curvature. We have discovered, however, that this secondary curvature is inherently inward.

We have theorized that this curvature arises because of the bending of ray 11 first toward the optical axis and then rather steeply away from it and because of the greater path length caused by that deviation. Stated differently, the fan of rays along ray 11 and perpendicular to the diagram (Fig. 1) emerges from lens surface 10 with a certain convergence, so that at a certain optical equivalent distance along ray 11 it comes to a focus. There is no optical surface power in elements 1 to 5 to change this convergence, and so, because of the greater path length along the crooked path of ray 11 than along a straight path, this distance "runs out" and the rays reach a focus before ray 11 reaches the focal plane 15.

Again considering only the main body of the anamorphoser, the primary curvature in the neutral plane (Fig. 2) is computed as if elements 1 to 5 were plane parallel plates. By standard computing formulae it is known that this leads to a backward curving field. The secondary curvature combines the effect of plane parallel plates in bending ray 21 and the effect of the surface curvatures on the convergence of the tangential fan of rays. This curvature, accordingly, does not follow the same rules as any known aberration of systems of spherical power, but it seems similar to the secondary curvature thereof in that it changes roughly one-third as fast as the primary curvature in the active plane when a cylindrical surface curvature is varied.

Whatever the true theory of these curvatures may be, we have discovered that an anamorphosing system of this type cannot be corrected without introducing an element having negative power in the neutral plane to contribute backward secondary field curvature to balance the inherently inward curving secondary field in the active plane.

In the example shown, we have introduced this negative field flattening element in the form of a negative meniscus element 6 having surfaces of spherical power, and then because unit magnification was required in the neutral plane, we added a plano-convex cylindrical element having positive power in the neutral plane of the system. Because of the shape of this element being plano-convex rather than meniscus, it only partially counteracts the field-flattening effect of the negative element, even though its power in this plane is greater than that of the spherical meniscus element.

The main part of the system, of course, has to be redesigned to readjust the primary curvature in the active plane, the coma, the spherical aberration and the axial astigmatism.

Both field curvatures in the neutral plane of the system were found to be within tolerable limits, and it is thought that this is at least partly due to the smaller angular field. It will be recalled that because of the anamorphotic or stretch magnification the field angle in this example is only half as great in the neutral plane as in the active plane.

Fig. 3 is a table giving constructional data for this system as finally designed, on a scale such that the total length from the vertex of the front surface to the plane of the anamorphosed image is 100 mm. This table is repeated as follows:

[Stretch magnification=2×.]

| Lens | N | V | Radii, mm. | Thicknesses, mm. |
|---|---|---|---|---|
| 1 | 1.611 | 58.8 | $R'_1 = +25.96$ | $t_1 = 5.76$ |
|   |       |      | $R'_2 = +61.75$ | $s_1 = 0.80$ |
| 2 | 1.605 | 43.6 | $R'_3 = +61.75$ | $t_2 = 3.01$ |
|   |       |      | $R'_4 = +21.64$ | $s_2 = 40.90$ |
| 3 | 1.517 | 64.5 | $R'_5 = -30.78$ | $t_3 = 2.78$ |
|   |       |      | $R'_6 = +36.07$ | $t_4 = 8.32$ |
| 4 | 1.649 | 33.8 | $R'_7 = -53.51$ | $s_3 = 1.11$ |
|   |       |      | $R'_8 = -53.51$ | $t_5 = 2.38$ |
| 5 | 1.517 | 64.5 | $R'_9 = +36.07$ | $s_4 = 19.63$ |
|   |       |      | $R_{10} = -34.38$ | $t_6 = 2.14$ |
| 6 | 1.517 | 64.5 | $R_{11} = -98.06$ | $s_5 = 0.40$ |
|   |       |      | $R_{12} = \infty$ | $t_7 = 3.26$ |
| 7 | 1.517 | 64.5 | $R''_{13} = -37.43$ | $L' = 9.51$ |

In this table, as in Fig. 3, the lens elements are numbered from front to rear in the first column and the respective refractive indices N for the D line of the spectrum and the dispersive indices V are given in the second and third columns. The front is taken as the end of the anamorphosing system which faces the standard system and the rear as the end nearest the focal plane. The radii of curvature R of the optical surfaces, the thicknesses $t$ of the lens elements and the spaces $s$ between elements, each numbered by subscripts from front to rear, are given in the fourth and fifth columns, as is also the distance L' from the last optical surface to the focal plane. The radii of curvature of cylindrical surfaces are designated as R' if curved in the active plane and as R'' if curved in the neutral plane. Also, as customary, the + and − values of the radii denote surfaces respectively convex and concave to the front.

The third component, elements 6 and 7, has a field flattening effect of about 0.4 mm. each on the primary and the secondary curvature in the active plane (Fig. 1) along a ray intersecting the final image plane at about 15 mm. from the axis.

In case unit magnification in the neutral plane is not required under other conditions of use, the element with positive power in the neutral plane may be omitted.

It will be noted that the system shown includes a positive member at the front and a negative member spaced therebehind, these members being predominantly of cylindrical power defining the active plane of the system, and behind the negative member a field flattening member comprising an element having negative power in the neutral plane and so bent in shape away from the shape of equal deviation of the principal ray at its two surfaces that it gives the field flattening member a net flattening effect on the inherently inward curving secondary field in the active plane.

It will be noted that element 7 is added for meeting required conditions which are not essential to the invention, hence this element is optional. However, it may be considered as part of the third member.

The degree of complexity of structure of the two front members depends upon the required aperture, field angle and stretch magnification, and the details of structure thereof are not considered as fundamental to the invention. However, for receiving an f/5.2 cone of rays from the standard system covering a 6° or 7° semi-field and for producing 2× stretch, we found an achromatic doublet adequate as a positive member and a triplet consisting of a positive element between two negative elements satisfactory as a negative member. For adjustment purposes, we prefer to have one airspace in each of these two members.

We claim:

1. An anamorphotic lens system adapted to receive a convergent bundle of light from a standard optical system in front thereof and to form a real anamorphosed image in a plane near the image plane of said standard optical system, comprising six lens elements predominantly of cylindrical power made of glasses having refractive indices N (measured in "D" light) and conventional dispersive indices V respectively within the ranges set forth in the following table:

$1.56 < N_1 < 1.66$   $54 < V_1 < 64$
$1.56 < N_2 < 1.66$   $39 < V_2 < 49$
$1.47 < N_3 < 1.57$   $59 < V_3 < 69$
$1.60 < N_4 < 1.70$   $29 < V_4 < 39$
$1.47 < N_5 < 1.57$   $59 < V_5 < 69$
$1.47 < N_6 < 1.57$   $59 < V_6 < 69$ said six lens elements being arranged in axial alignment in the order indicated by the subscripts 1 to 6 counting from front to rear, the side nearest the locus of said standard system being designated as the front, characterized by said six lens elements being so shaped and arranged that the radii of curvature R of the optical surfaces (as measured in the active plane), the thicknesses $t$ of the lens elements and the axial separations between the lens elements are respectively within the ranges set forth in the following table, each category being numbered by subscripts in order from front to rear:

| Lens | Radii | Thickness and Separation |
|---|---|---|
| 1 | $.208 L < +R_1 < .312 L$ | $.005 L < t_1 < .007 L$ |
|   | $.494 L < +R_2 < .741 L$ | $000 < s_1 < .002 L$ |
| 2 | $.494 L < +R_3 < .741 L$ | $.002 L < t_2 < .004 L$ |
|   | $.173 L < +R_4 < .260 L$ | $.036 L < s_2 < .046 L$ |
| 3 | $.246 L < -R_5 < .369 L$ | $.002 L < t_3 < .004 L$ |
|   | $.289 L < +R_6 < .433 L$ | $.007 L < t_4 < .009 L$ |
| 4 | $.428 L < -R_7 < .642 L$ | $.000 L < s_3 < .002 L$ |
|   | $.428 L < -R_8 < .642 L$ | $.002 L < t_5 < .004 L$ |
| 5 | $.289 L < +R_9 < .433 L$ | $.015 L < s_4 < .025 L$ |
|   | $.275 L < -R_{10} < .413 L$ | $.001 L < t_6 < .003 L$ |
| 6 | $.784 L < -R_{11} < 1.18 L$ | | where L is the total length of the anamorphotic system from the front lens surface to the plane of the anamorphosed image and where the + and − values of the radii denote surfaces respectively convex and concave to the front.

2. An anamorphotic system as claimed in claim 1 comprising in addition a lens element having positive power in the axial plane perpendicular to the active plane, said system having a magnification of 1.00 in said plane perpendicular to the active plane.

References Cited in the file of this patent

UNITED STATES PATENTS

| | | |
|---|---|---|
| 1,354,040 | Hammon | Sept. 28, 1920 |
| 1,421,523 | Mechau | July 4, 1922 |
| 1,932,082 | Newcomer | Oct. 24, 1933 |
| 1,962,892 | Chretien | June 12, 1934 |
| 2,121,567 | Newcomer | June 21, 1938 |
| 2,721,500 | Kohler et al. | Oct. 25, 1955 |

FOREIGN PATENTS

| | | |
|---|---|---|
| 624,178 | Germany | Jan. 14, 1936 |
| 1,082,780 | France | June 23, 1954 |